UNITED STATES PATENT OFFICE.

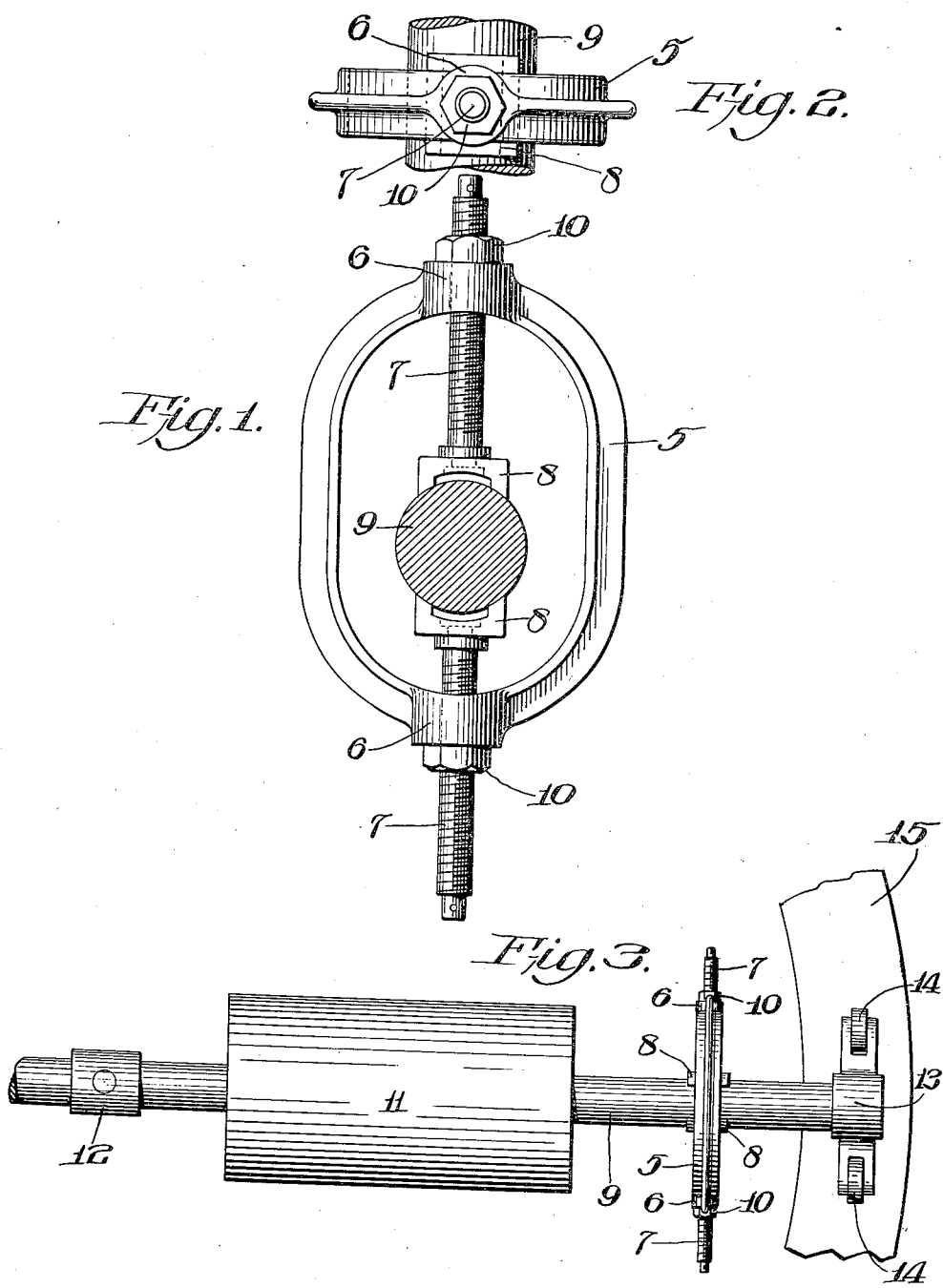

NICHOLAS W. AKIMOFF, OF PHILADELPHIA, PENNSYLVANIA, ASSIGNOR TO VIBRATION SPECIALTY COMPANY, A CORPORATION OF DELAWARE.

BALANCING APPLIANCE.

1,313,039.     Specification of Letters Patent.     Patented Aug. 12, 1919.

Application filed May 11, 1917, Serial No. 167,919. Renewed June 24, 1919. Serial No. 306,445.

*To all whom it may concern:*

Be it known that I, NICHOLAS W. AKIMOFF, a citizen or subject of the constituted government of Russia, but who has declared his intention of becoming a citizen of the United States, residing at Philadelphia, in the county of Philadelphia and State of Pennsylvania, have invented certain new and useful Improvements in Balancing Appliances, of which the following is a specification.

My invention relates to a balancing appliance, that is to say, to an apparatus adapted to ascertain, for the purpose of correction, the quantum of unbalance existing in a rotatable body, such for example as a machine element which for its most efficient operation requires that the mass be properly distributed so as to rotate without setting up vibration or objectionable periodic stresses.

The object, therefore, of my invention is to provide a simple and efficient appliance which may be readily and conveniently mounted with respect to a rotatable body whereby the amount of unbalanced distribution of the mass of said rotatable body may be quickly and easily determined, and for the accomplishment of this object my invention contemplates the provision of an appliance which may be mounted on a rotatable shaft adjacent the body or element under examination and which may be adjusted on said shaft both angularly and longitudinally and which is so constructed as to permit a radial shift of the mass of the appliance itself.

The nature and characteristic features of my invention will be more readily understood from the following description taken in connection with the accompanying drawings forming part hereof, in which—

Figure 1 is an elevational view of an appliance embodying the main features of my invention the same being shown mounted on a shaft "off center" as required when an unbalanced distribution of the mass exists in the body or element under examination.

Fig. 2 is an end view thereof; and

Fig. 3 is a plan view, to a certain extent diagrammatic, showing the manner of use of the appliance.

Referring to the drawings, in the particular embodiment of my invention therein shown, the appliance consists primarily of a body of a desired or predetermined mass preferably in the form of an elliptical frame or yoke 5 which is symmetrical about each of the two axes at right angles to the axis of rotation. At each end of the frame there is preferably provided a boss or lug 6, interiorly threaded for the mounting of oppositely disposed set screws 7. The set screws 7 are of the same shape and size and are each provided at their inner ends with saddle blocks 8 for engaging the surface of the shaft 9 upon which the appliance may be mounted. Suitable lock nuts 10 may also be provided, one on each set screw 7 outside the respective lugs 6 of the frame or yoke 5.

All the parts are accurately made, calibrated, and balanced, so that when the appliance is centrally adjusted upon the shaft there will be no centrifugal effect when the shaft is rotated. By adjusting the set screws 7 the center of gravity of the frame 5 may be thereby displaced to any desired distance from the center of the shaft to thereby create a centrifugal force which will correspond to the mass of the frame 5 multiplied by the radius of the displacement multiplied by the square of the angular speed.

Referring now more particularly to Fig. 3 of the drawings there is there shown, more or less diagrammatically, a body 11 mounted upon the shaft 9, which body is the one under examination for the determination of the amount of correction necessary to balance the same to correct any inequality in the distribution of the mass thereof. The shaft 9 is journaled in a pivoted bearing 12 arranged to one side of the body 11 and the other end of the shaft is mounted in a bearing 13 which is supported preferably by means of rollers 14 on a suitable track 15 whereby the bearing 13 is capable of oscillating side-wise movement. The balancing appliance of my invention is mounted on the shaft 9 between the body 11 and the movable bearing 13.

The operation of the device can now be readily understood. Assume that the body 11 is in static balance and that its center of gravity is coincident with the axis of rotation, and it is desired to ascertain its dynamic unbalance, and the extent thereof, whereby the same may be corrected. The body 11 is arranged as shown in Fig. 3, with the balancing appliance arranged as shown, and then by trial adjustment the operator may determine the proper angular position as well as the proper longitudinal location on the shaft 9 until angular vibration of the end of the shaft which is journaled in the movable bearing is eliminated. By measuring the relative projection of the two set screws 7 the extent of displacement of the frame 5 may be ascertained, and the value of the centrifugal force for a certain unit speed may be determined and by multiplying the value thus obtained by the distance of the balancing appliance from the axis of the pivot of the bearing 12 there is thus determined the balancing couple which is required to correct the inequality in the distribution of the mass of the body 11 and from this value the amount and location of the correcting weight required may be readily determined.

It will thus be seen that there is thus provided a simple and efficient appliance whereby the dynamic unbalance of a body such as a machine element may be counterbalanced for the purpose of determining the amount and location of correcting weight or weights required, and that this value may be ascertained in functions of a single linear dimension, to wit, the amount of off center adjustment of the center of gravity of the appliance which is indicated by the difference in the extent of projection of the ends of the set screws 7.

Having thus described the nature and characteristic features of my invention, what I claim as new and desire to secure by Letters Patent is,

1. A balancing appliance adapted to be adjustably mounted upon a rotatable shaft adjacent a body under examination to determine the unbalance existing in said body comprising a device having a portion of predetermined mass adapted to be arranged symmetrically about two axes at right angles to the axis of rotation of the shaft, and means for shifting the center of gravity thereof with respect to the axis of rotation.

2. A balancing appliance adapted to be adjustably mounted upon a rotatable shaft adjacent a body under examination to determine the unbalance existing in said body comprising a device having a portion of pre-determined mass adapted be arranged symmetrically about two axes at right angles to the axis of rotation of the shaft, means for shifting the center of gravity thereof with respect to the axis of rotation, and means for indicating the extent of the off-center adjustment thereof.

3. A balancing appliance adapted to be adjustably mounted upon a rotatable shaft adjacent a body under examination to determine the unbalance existing in said body comprising a device surrounding said shaft having a portion of pre-determined mass adapted to be arranged symmetrically about two axes at right angles to the axis of rotation of the shaft, means for shifting the center of gravity thereof with respect to the axis of rotation, and means for indicating the extent of the off-center adjustment thereof.

4. A balancing appliance of the character described comprising a frame or body portion of pre-determined mass, means for mounting the same upon a rotatable shaft, said frame or body portion being adapted to be arranged symmetrically about two axes at right angles to the axis of rotation of the shaft, and means for shifting the center of gravity thereof with respect to the axis of rotation of said shaft.

5. A balancing appliance of the character described comprising a frame or body portion of pre-determined mass, means for mounting the same upon a rotatable shaft, said frame or body portion being adapted to be arranged symmetrically about two axes at right angles to the axis of rotation of the shaft, means for shifting the center of gravity thereof with respect to the axis of rotation of said shaft, and means for indicating the amount of off-center adjustment thereof.

6. A balancing appliance of the character described comprising a frame or body portion of pre-determined mass, means for mounting the same upon a rotatable shaft, said frame or body portion surrounding said shaft and being adapted to be arranged symmetrically about two axes at right angles to the axis of rotation of the shaft, means for shifting the center of gravity thereof with respect to the axis of rotation of said shaft, and means for indicating the amount of off-center adjustment thereof.

7. A balancing appliance of the character described comprising a symmetrical frame of predetermined mass, and means for mounting said frame upon a rotatable shaft comprising oppositely disposed set screws whereby the center of gravity of said frame may be shifted with respect to the axis of rotation of said shaft and whereby the amount of off center adjustment of said frame may be determined by the relative extensions of said set screws.

NICHOLAS W. AKIMOFF.